United States Patent [19]
Lemaire

[11] Patent Number: 5,957,275
[45] Date of Patent: Sep. 28, 1999

[54] REUSABLE CONTAINER FOR COINS OR TOKENS

[76] Inventor: Réal Lemaire, 3725 boul. Jean-de-Brébeuf, Drummondville Québec, Canada, J2B 6V2

[21] Appl. No.: 09/011,507

[22] PCT Filed: Aug. 4, 1995

[86] PCT No.: PCT/CA95/00468

§ 371 Date: Apr. 6, 1998

§ 102(e) Date: Apr. 6, 1998

[87] PCT Pub. No.: WO97/05799

PCT Pub. Date: Feb. 20, 1997

[51] Int. Cl.$^6$ .............................. A45C 1/00; B65D 85/00; B65D 8/18; B65D 43/16
[52] U.S. Cl. .......................... 206/83; 206/445; 220/4.23; 220/835; 220/839
[58] Field of Search ................................... D21/392, 393; 206/82, 83, 445; 220/4.21, 4.23, 339, 835, 839

[56] References Cited

U.S. PATENT DOCUMENTS

| | | |
|---|---|---|
| D. 148,220 | 12/1947 | Foier . |
| 189,939 | 4/1877 | Huested . |
| 245,912 | 8/1881 | Young . |
| D. 268,219 | 3/1983 | Janetos . |
| D. 273,403 | 4/1984 | DeLuca ................................ D21/392 |
| D. 332,746 | 1/1993 | Garcia . |
| 610,727 | 9/1898 | Schlemmer . |
| 645,635 | 3/1900 | Thompson . |
| 712,087 | 10/1902 | O'Neill . |
| 994,893 | 6/1911 | Voye . |
| 2,185,359 | 1/1940 | Swanson . |
| 2,544,118 | 3/1951 | Went . |
| 3,127,009 | 3/1964 | Feis et al. . |
| 3,164,478 | 1/1965 | Bostrom . |
| 3,402,806 | 9/1968 | Sutherland et al. . |
| 3,420,359 | 1/1969 | Cochrane ............................... 206/0.82 |
| 3,552,595 | 1/1971 | Gerner et al. .......................... 220/4.23 |
| 3,933,296 | 1/1976 | Ruskin et al. ....................... 220/339 X |
| 3,981,395 | 9/1976 | Dalgleish .............................. 206/0.82 |
| 4,139,093 | 2/1979 | Holmes ................................. 206/0.82 |
| 4,183,432 | 1/1980 | Lemaire . |
| 4,234,080 | 11/1980 | Gellert . |
| 4,240,544 | 12/1980 | Barnhart et al. . |
| 4,290,523 | 9/1981 | Wallace ................................ 206/0.82 |
| 4,408,763 | 10/1983 | Simons ............................... 206/445 X |
| 4,541,528 | 9/1985 | Holmes ................................. 206/0.82 |
| 4,606,471 | 8/1986 | Quercetti . |
| 5,022,518 | 6/1991 | Therrien . |
| 5,207,612 | 5/1993 | Wollaston . |

FOREIGN PATENT DOCUMENTS

| | | | |
|---|---|---|---|
| 219479 | 8/1957 | Australia ............................. 206/0.82 |
| 128422 | 6/1931 | Austria . |
| 262142 | 8/1967 | Austria . |
| 537904 | 5/1955 | Belgium . |
| 813120 | 5/1969 | Canada . |
| 1075177 | 4/1980 | Canada . |
| 763970 | 2/1934 | France . |
| 801246 | 10/1936 | France . |
| 1253354 | 1/1961 | France . |
| 1503922 | 10/1967 | France . |
| 1503922 | 12/1967 | France ................................. 206/0.82 |
| 91668 | 8/1896 | Germany ............................. 206/0.82 |
| 896129 | 7/1949 | Germany . |
| 3510505 | 10/1986 | Germany . |
| 4124439 | 7/1993 | Germany . |
| 710591 | 7/1966 | Italy . |
| 2023101 | 5/1979 | United Kingdom . |
| 2023101-A | 12/1979 | United Kingdom . |

Primary Examiner—Bryon P. Gehman
Attorney, Agent, or Firm—Milton Oliver; Ware, Fressola, Van Der Sluys & Adolphson LLP

[57] ABSTRACT

The reusable container (1) is made of moldable plastic sheet (5). The container (1) comprises a first sheet portion (11) that is molded to define a substantially semi-cylindrical recess (13) divided into two compartments (23). A second sheet portion (31) is molded to define a substantially semi-cylindrical recess (33) and is used as a first cover (39) for the container (1). A third sheet portion (51) is also molded to define a substantially semi-cylindrical recess (53) and is used as a second cover (59).

20 Claims, 8 Drawing Sheets

REUSABLE CONTAINER FOR COINS OR TOKENS

FIELD OF THE INVENTION

The present invention relates to a reusable container for coins or tokens.

DESCRIPTION OF THE PRIOR ART

There are many patents describing containers for coins or tokens. For example, U.S. Pat. Nos. 4,139,093, 4,183,432, 4,290,523 and Des. 268,219 disclose containers for coins or tokens. More particularly, U.S. Pat. Nos. 4,240,544, 4,541,528 and 4,715,492 disclose containers provided with inner partitions that are designed to hold dividing the container into small compartments.

However, these containers are expensive to produce and are likely to accidentally open under an impact. There is thus an important need for a reusable container for coins or tokens which can be cheaply manufactured and which provides a good resistance to an accidental opening, particularly when submitted to an impact.

DESCRIPTION OF THE INVENTION

A first object of the present invention is to provide a container for coins or tokens which is prevented from self-opening under an impact as well as being inexpensive to manufacture.

Another object of the invention is to provide a container which may be made of inexpensive materials and by using simple and inexpensive processes.

Another object of the invention is to provide a container for coins or tokens which allows to hold an exact number of coins or tokens, despite the fact that some of them are worn up to a point that the thickness thereof be slightly reduced.

Another object of the invention is to provide a container for coins or tokens which allows to immediately detect if there is an extra piece therein by preventing its covers from closing.

BRIEF DESCRIPTION OF THE DRAWINGS

The present invention will be better understood in the light of the following description, made with reference to the following drawings.

DESCRIPTION OF THE PREFERRED EMBODIMENTS OF THE INVENTION

FIGS. 1 to 8 illustrate a reusable container for coins 3. This container 1 is molded in a plastic sheet 5 having a pair of opposite longitudinal sides 7 and a pair of opposite transversal sides 9. Preferably, the plastic sheet is made of thermoplastic.

The kind of plastic used in the present invention may vary to a large extent. A person skilled in the art may easily select a plastic sheet with his or her general knowledge. For example, the plastic sheet may be made of PVC, PETG or PET. The thickness may also vary in a large extent. Preferably, the thickness is between 8 to 10 mils. Also, the plastic material may be made or partially made of recycled plastic. Yet, the methods for manufacturing the container according to the invention are known to a person skilled in the art and do not require a detailed description. The thermoforming is a preferred process. In the enclosed FIGS. 1 to 16, the thickness of the sheets has been voluntarily exaggerated for a better understanding of the invention.

The container 1 comprises a first portion 11 that is at least partially moulded to define a recess 13 and that is substantially semi-cylindrical. Its cross section is preferably corresponding to a segment representing about 40% of a circle, as illustrated in the drawings. This first portion 11 has a pair of longitudinal sides 17 and 19, which are substantially mutually parallel and further parallel to the longitudinal sides 7 of the sheet 5.

First divider means 21 are used to divide the recess 13 in at least two compartments 23, each having a predetermined size to receive a predetermined number of coins 3. Preferably, the first divider means 21 comprise a dividing element 22, in the form of a boss.

The contain 1 also comprises a second portion 31 that is at least partially moulded in the sheets to define a recess 33, and that is substantially semi-cylindrical. Its cross section preferably corresponds to a segment representing about 10–20% of a circle. This second portion 31 comprises a pair of longitudinal sides 35 and 37, which are substantially mutually parallel and are further parallel to the longitudinal side 17 of the first portion 11. The second portion 31 defines a first cover 39 of the container 1.

Second divider means 41 divide the recess 33 in at least two compartments 43, each having a predetermined size to receive the coins in the compartment 23.

A third portion 51 is at least partially moulded in the sheet 5 to define a recess 53, that is substantially semi-cylindrical. Its cross section preferably corresponds to a segment representing about 10–20% of a circle. This third portion 51 comprises a pair of longitudinal sides 55 and 57, which are substantially mutually parallel and are further parallel to the longitudinal side 19 of the first portion 11. The third portion 51 defines a second cover 59 of the container 1.

The recess 53 may comprise third divider means 65. These third divider means 65 divide the recess 53 of the third portion 51 into at least two compartments 63, each having a predetermined size to receive a corresponding portion of the first cover 39.

First hinge means 61 are provided to pivotally connect the longitudinal side 17 of the first portion 11 with the longitudinal side 35 of the second portion 31.

Similarly, the second hinge means 71 are provided to pivotally connect the longitudinal side 19 of the first portion 11 with the longitudinal side 55 of the third portion 51.

Each of the first cover 39 and the second cover 59 may be moved between two distinct positions. The first cover 39 may be moved between an open position, where the compartments 43 are not aligned with the compartments 23 of the recess 13, and a closed position, where the compartments 43 are aligned with the compartments 23 of the recess 13. The second cover 59 may be moved between two extreme positions, namely an open position, where the compartments 63 of the recess 53 are not aligned with the first cover 39 when the latter is in a closed position, and a closed position, where the first cover 39 is located in the recess 53.

The first hinge means 61 advantageously comprise:
the plastic sheet 5 and comprises a first sheet portion 73, having a pair of longitudinal sides 75 and 77 which are substantially mutually parallel and further parallel to the longitudinal side 17 of the first portion 111.
Third hinge means 91 are used for pivotally connecting the longitudinal side 75 with the longitudinal side 17 of the first portion 11.
Fourth hinge means 101 are used for pivotally connecting the longitudinal side 77 of the first sheet portion 73 with the longitudinal side 35 of the second portion 31 39.
Similarly, the second hinge means 71 are preferably integral with:
the plastic sheet 5 and comprises a second sheet portion 111, said portion having a pair of longitudinal sides 113 and 115 which are substantially mutually parallel and further parallel to a longitudinal side 19 of the first portion 111.
Fifth hinge means 121 are used for pivotally connecting the longitudinal side 113 with the longitudinal side 19 of the first portion 111.
Sixth hinge means 131 are used for pivotally connecting the longitudinal side 115 with the longitudinal side 35.
Advantageously, each of the third, fourth, fifth and sixth hinge means consist of a small groove in the plastic sheet 5.

Figure 6:
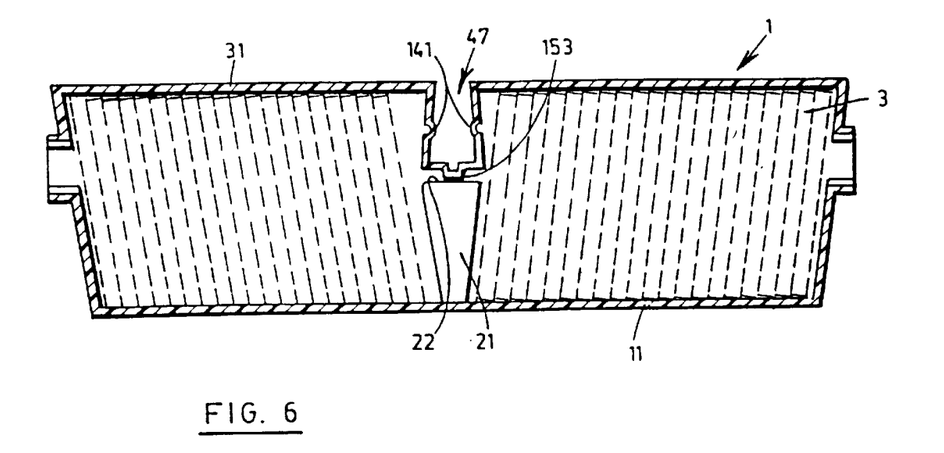
FIG. 6 is a longitudinal cross-sectional view, taken along line VI—VI, of the container of FIG. 4.

As best shown in FIG. 6, each of the compartments 43 and 63 has opposite ends that slightly converge towards each other from the bottom of said compartment and the opposite ends of the compartment 23 slightly diverge from each other, starting from the bottom of said compartment.

Advantageously, the reversible locking means 81 of the first cover 39 comprise assemblies of the type boss-cavity, at least one boss 141 being provided on each end of the compartments 43 and a cavity 143 being provided on each end of the compartments 63. Each boss 141 of an end of the compartment 43 corresponds to a cavity 143 on the end of a compartment 63, the compartments being sized to receive the covers 39 and 59 in an engaging and cooperative fashion for mutually and removably locking them together.

Figures 7, 8:
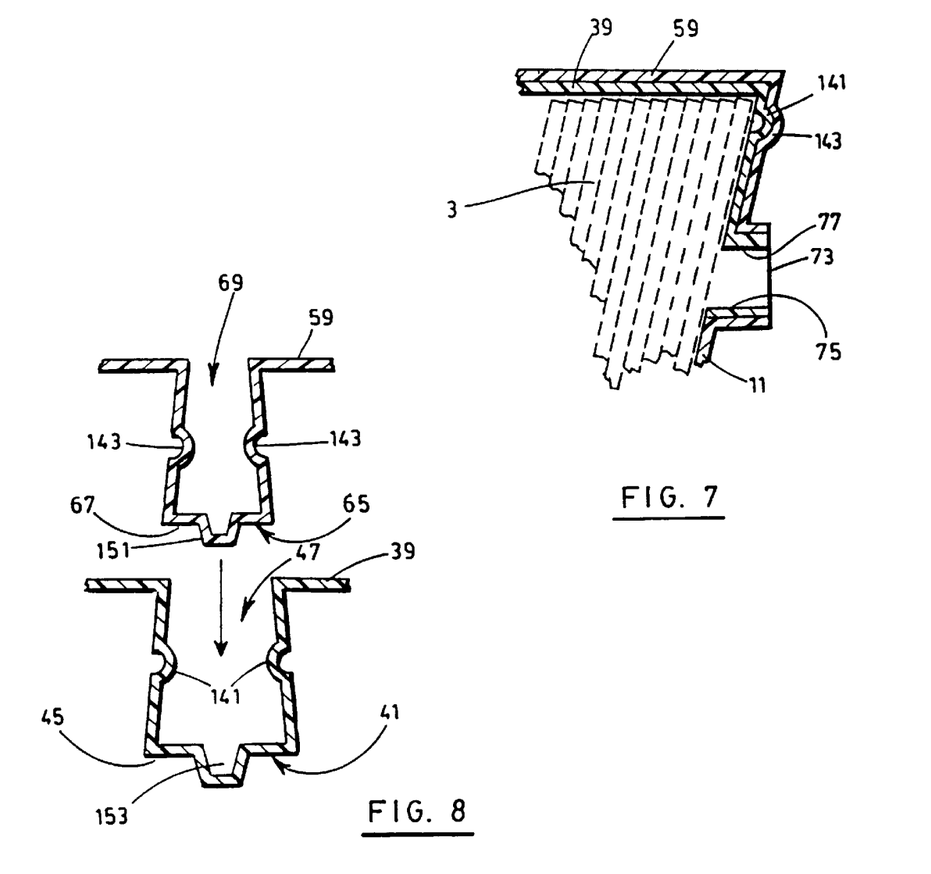
FIG. 7 is a cross-sectional view, taken along line VII—VII, of the container of FIG. 4.
FIG. 8 is a cross-sectional and exploded view, taken along line VIII—VIII, of the container of FIG. 5.

Advantageously, the second divider means 41 comprise a dividing element 45 located transversely in the recess 33. This dividing element 45 includes a first groove 47 having a bottom, opposite walls and an access opening opposite the one of the compartment 43. The dividing element 45 is aligned with the corresponding first divider means 21. The third divider means 65 are located transversely in the recess 53 of the third portion 51 and comprise a second groove 69 having a bottom, opposite walls and an opening opposite the one of the recess 53. The dividing element 67 of the recess 53 of the third portion 51 is engageable into the groove 47 of the second portion 31. Preferably, the grooves 47 and 69 have the shape of a dovetail (as illustrated in FIG. 8), each groove having a bottom and walls which converge towards each other from the bottom thereof. Optionally, the dividing element 67 is provided with an indexing means, such as the one illustrated in the drawings, and an indexing stopper 151. The dividing element 45 may be provided with a cavity 153 to receive said stopper. The arrangement prevents the covers 39 and 59 from closing in an inappropriate sequence.

Advantageously, reversible locking means 81 similar to the ones already described are provided in the opposite walls of the grooves 47 and 69.

Advantageously, the sheet 5 has a reinforcement edge 79 for the whole container 1.

Advantageously, the third portion 51 provides a prehension tongue 83 on the longitudinal side 57.

Advantageously, as illustrated in FIG. 6, the corresponding ends of the recesses defining the compartments are set as to position the coins or tokens as being substantially parallel to said ends and preventing the closing of the cover if there is an extra coin or token in one of the compartments. If an extra coin is present, the coin which is the closest to the first dividing element 22 will be lifted with reference to the other 5.

Of course, a person skilled in the art may easily provide changes in the dimensions of the various parts of the container and that are mutually engageable. Preferably, the dimensions of the groove 47 may be slightly greater than those of the groove 69 in order to facilitate the introduction of the latter in the first. This same principle applies to the external dimensions of the first cover with reference to the recess 53 or to the compartments 63 of the second cover 59, as well as the various bosses which are engageable in respective cavities.

To use the container 1 according to the invention, one has to insert coins or tokens 3 in the compartments 23 until they are full. Then, the first cover 39 is pivoted around the hinge 61 of the first element 73 and the second cover 59 around the hinge of the second element until the bosses 141 are engaged in the corresponding cavity 143. If there is an extra coin or token 3 in at least one of the compartments 23, it will be impossible to close the covers 39 and 59 adequately, as one of the coins or tokens which is the closest to the first divider means 21 will be slightly lifted upwards with reference to the stack of coins or tokens. One has then to pivot the covers 39 and 59 back into the open position and remove the extra coin or token before repeating the closing steps.

To recover coins or tokens from the container 1, one has to invert the closing steps.

In FIGS. 9 to 12, there is shown a first variant of the container according to the invention. Preferably, the illustrated container 201 is slightly identical to the container 1 illustrated in FIGS. 1 to 8, with the exception of the following:

the reversible locking means 81 are preferably replaced by reversible locking means 281';

the first divider means 21 are preferably replaced by first divider means 221';

the indexation means (i.e. the indexation stopper 151 and recess 153) are removed;

the reinforcement edge 79 is replaced by a very thin edge or preferably removed from the longitudinal side 237;

the prehension tongue 83 is preferably replaced by a tongue 283'.

All the other parts of the container 201 are advantageously identical to those of the container 1. In FIGS. 9 to 12, the reference numerals are identical, with the exception that they have been incremented by "200". For example, the hinge 61 of the container in FIG. 2 is identical to the hinge 261 in FIG. 9, and so forth.

Figure 11:
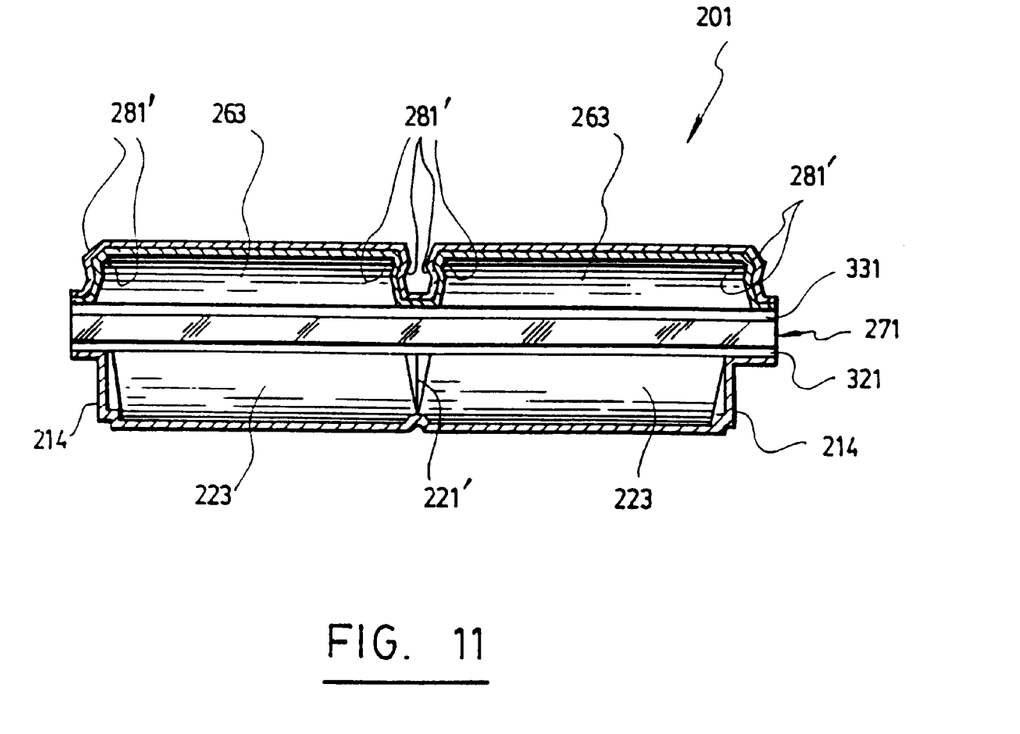
FIG. 11 is a longitudinal cross-sectional view of the container of FIG. 9, shown with the covers in a closed position and taken along line XI—XI.
Figure 12:
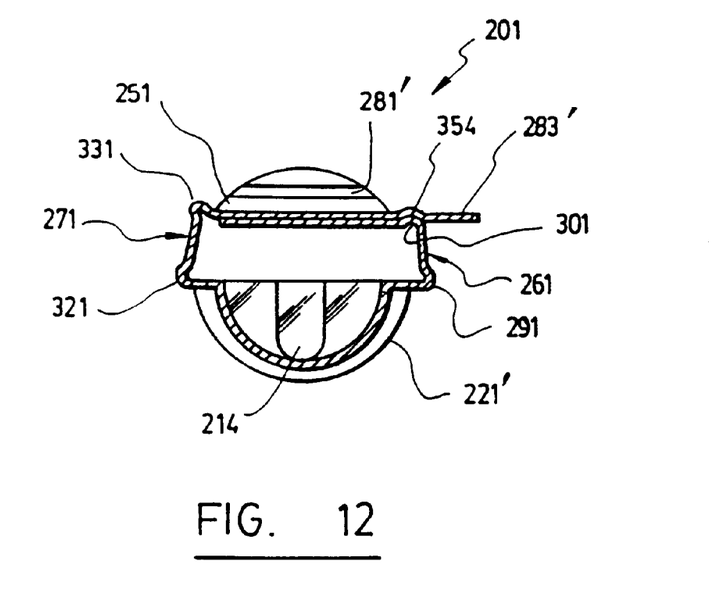
FIG. 12 is a cross-sectional view of the container of FIG. 9, shown with the covers in a closed position and taken along line XII—XII.

As shown in FIG. 11, the reversible locking means 281' includes bosses and cavities and are preferably extending on the whole width of the upper portion of the ends of the compartments 243 and 263. Preferably, they consist in an association of cavities and angulated bosses having corresponding profiles.

Figure 1:
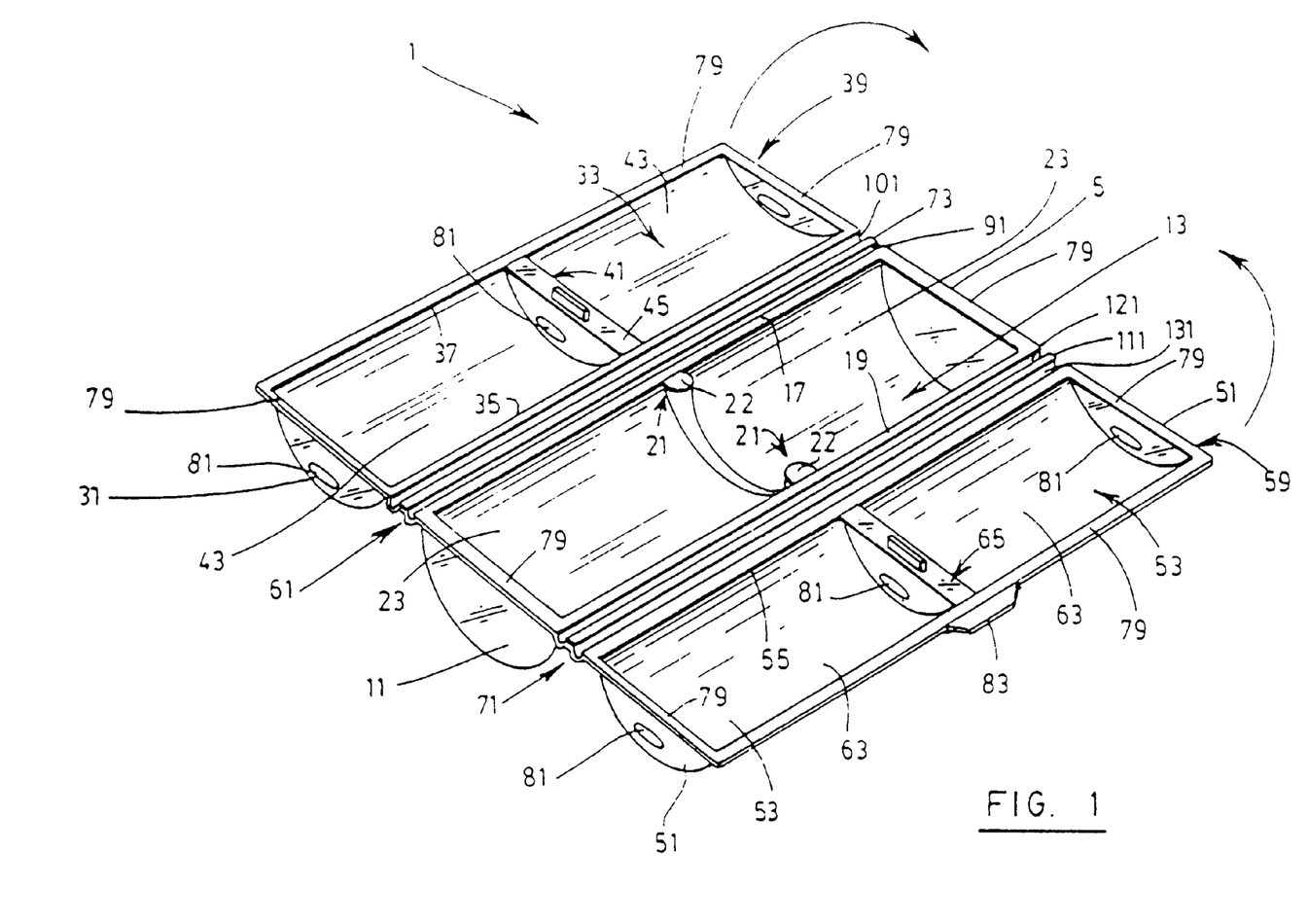
FIG. 1 is a perspective view of a container according to the invention, shown with the covers in an open position.
Figure 2:
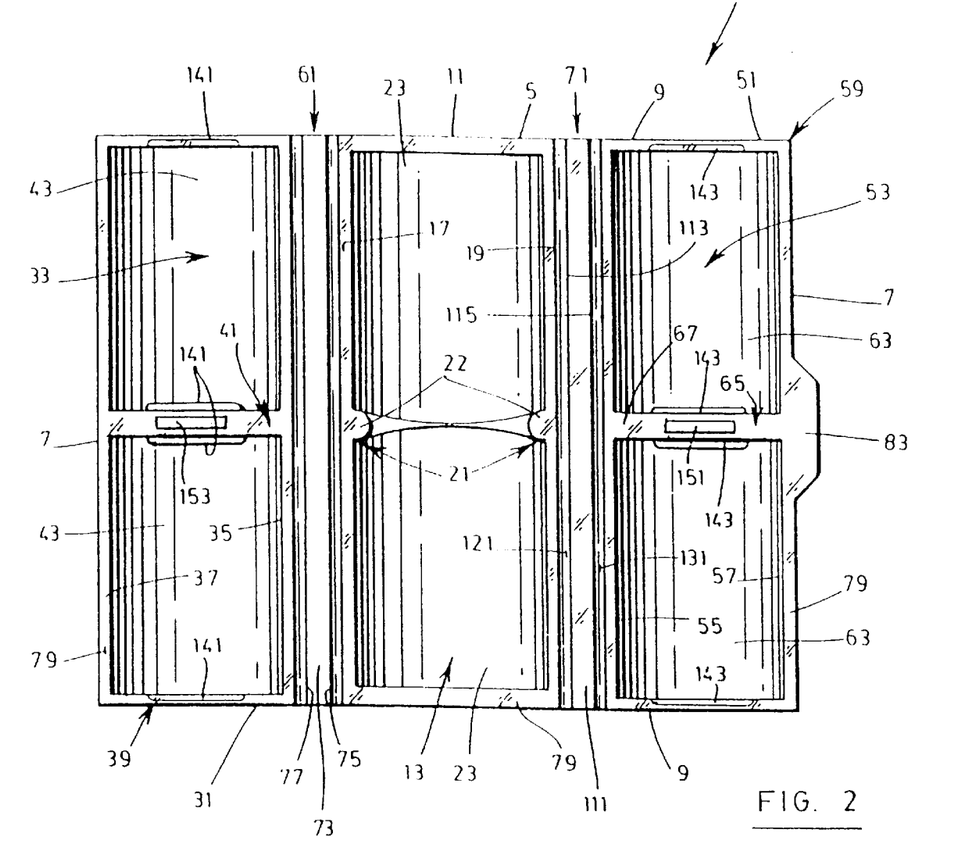
FIG. 2 is a top view of the container according to the invention, shown with the covers in an open position.
Figure 3:
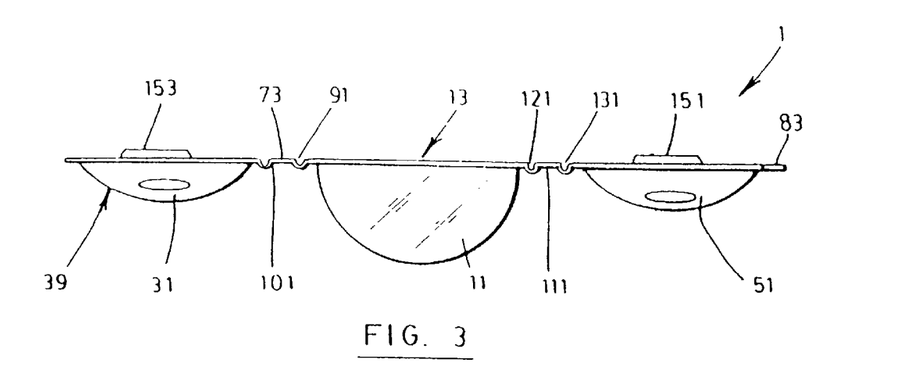
FIG. 3 is a side view of the end of the container shown in FIG. 2.
Figure 4:
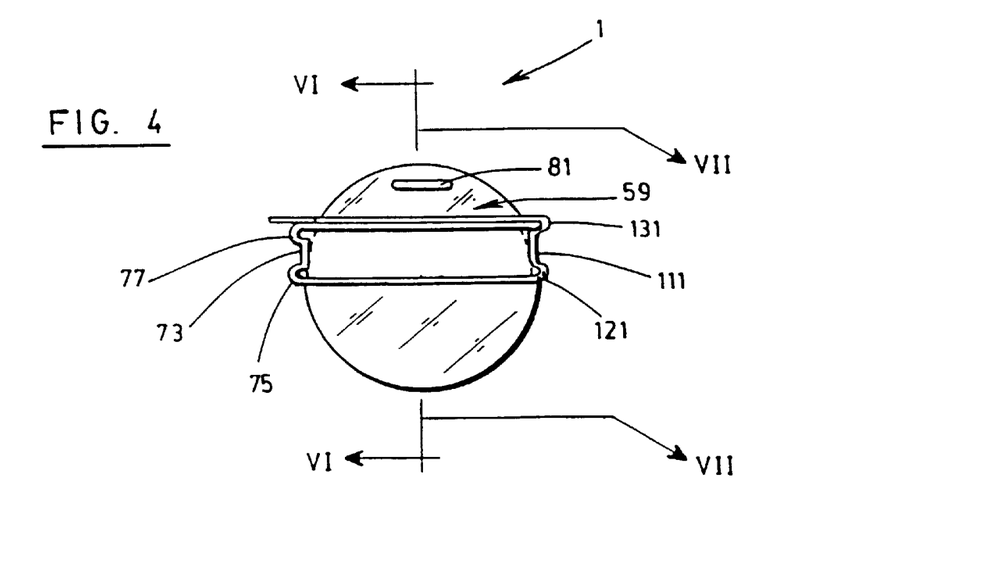
FIG. 4 is a side view of the end of a container according to the invention, shown with the two covers in a closed position and with coins located therein.
Figure 5:
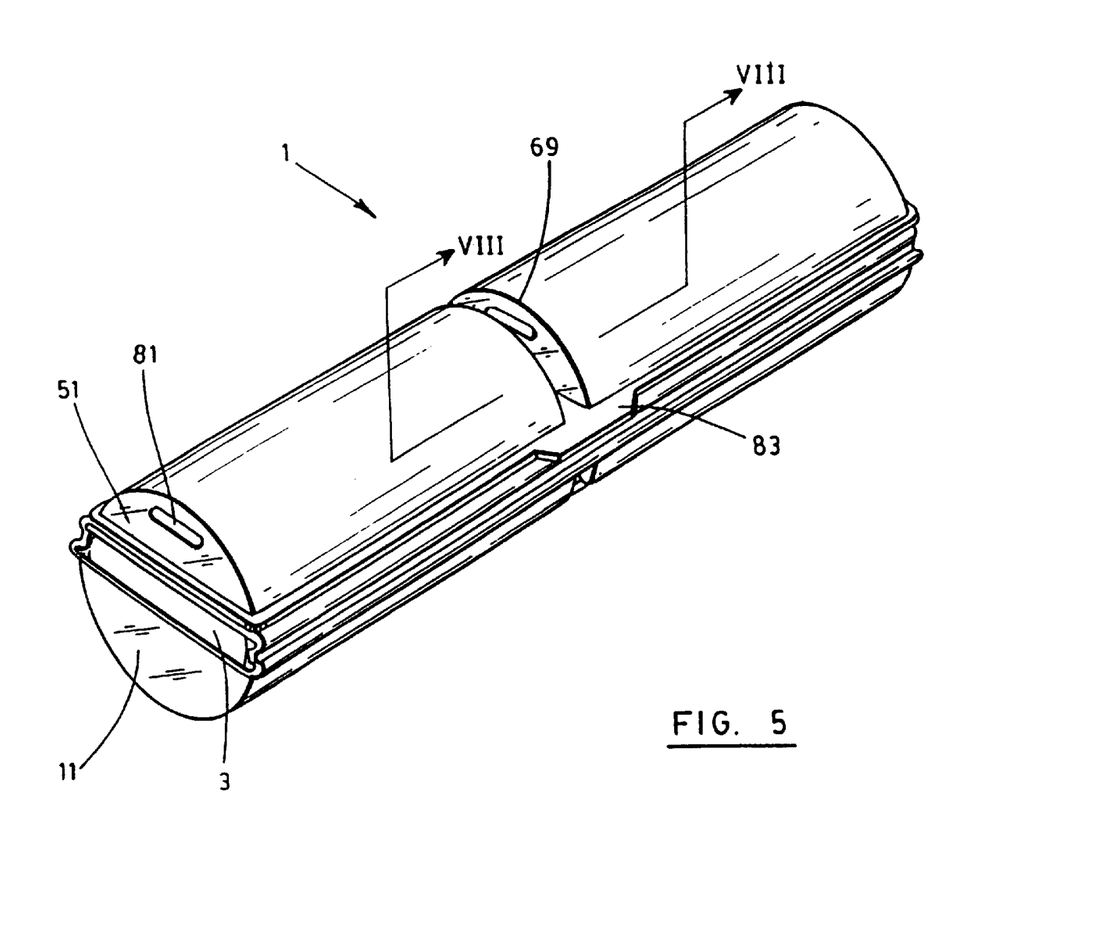
FIG. 5 is a perspective view of the container of FIG. 1, shown with the covers in a closed position and with coins located therein.

The divider means 221' preferably show a dividing element 222' similar to the dividing element 22 illustrated in FIGS. 1, 2 and 6, except that its profile is rounded. Preferably, it has a triangular profile with a cross section that becomes smaller towards the bottom of the cavity of the first portion. This configuration further eases the lifting of an extra coin or token with reference to the alignment of a stack of coins or tokens in either one of the compartments 223.

The suppression of the edge 79 on the longitudinal side 37 allows to further facilitate the closing of the second cover 259.

The prehension tongue 283' is different from the one of the container illustrated in FIGS. 1 to 8 in that it preferably extends along the whole length of the longitudinal side 257. This further eases the manipulation of said tongue. The tongue 283' is connected to the edge 279 of the cover 259 by a hinge 354. This latter hinge is of the same type than that of the hinges 61, 71, 91 and 101.

The use of the container 201 is identical to that of the container 1.

Figure 13:
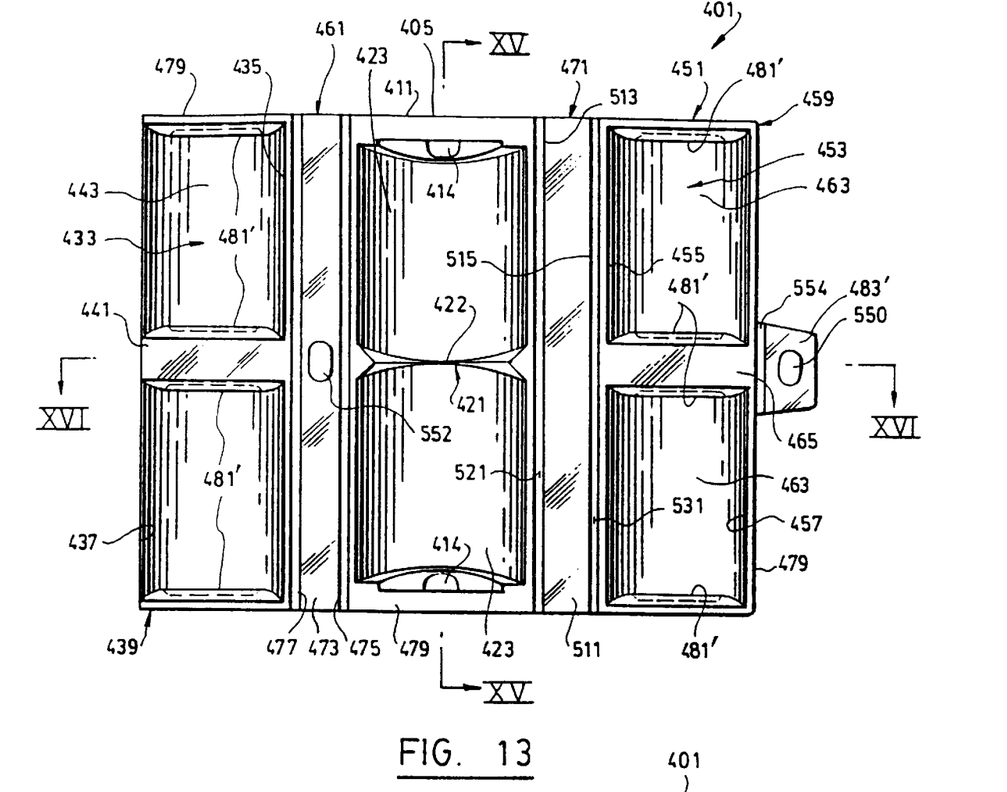
FIG. 13 is a top view of a second variant of the container according to the invention, shown with the covers in an open position.
Figure 14:
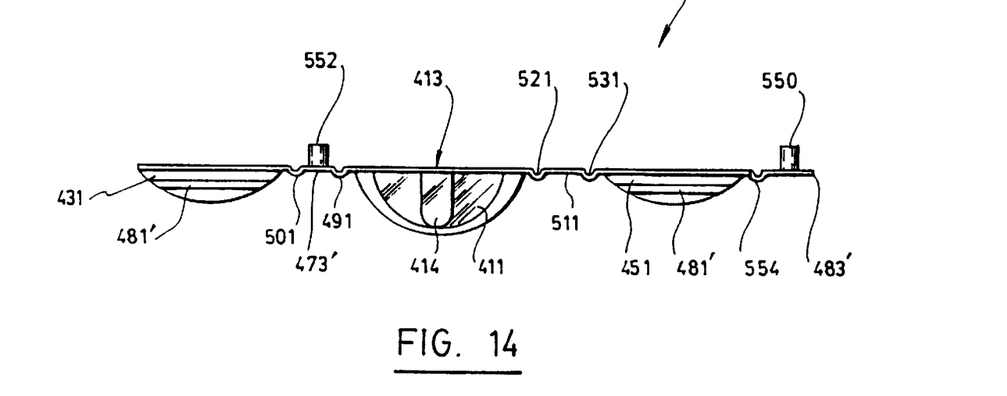
FIG. 14 is a side view of the end of the container of FIG. 13.
Figure 15:
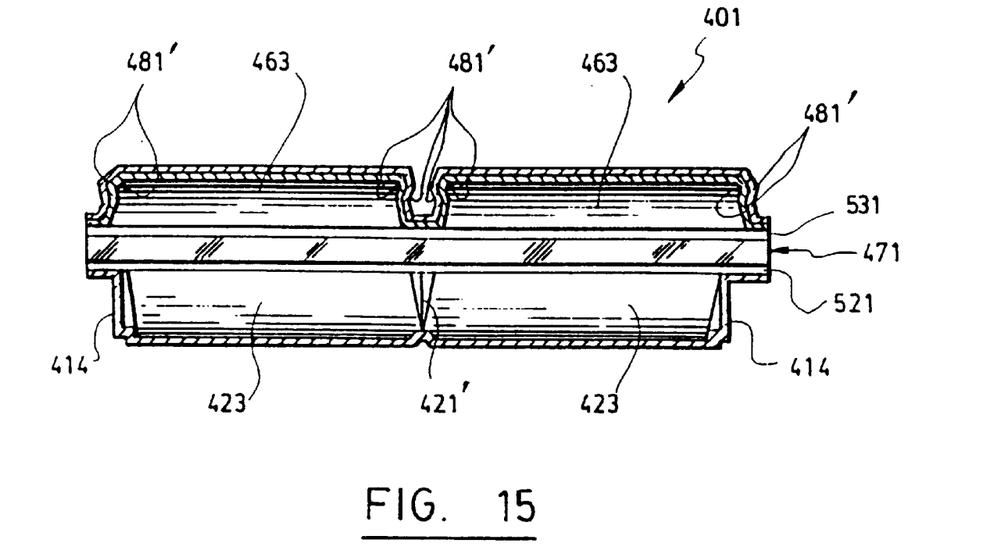
FIG. 15 is a longitudinal cross-sectional view of the container of FIG. 13, shown with the covers in a closed position and taken along line XV—XV.
Figure 16:
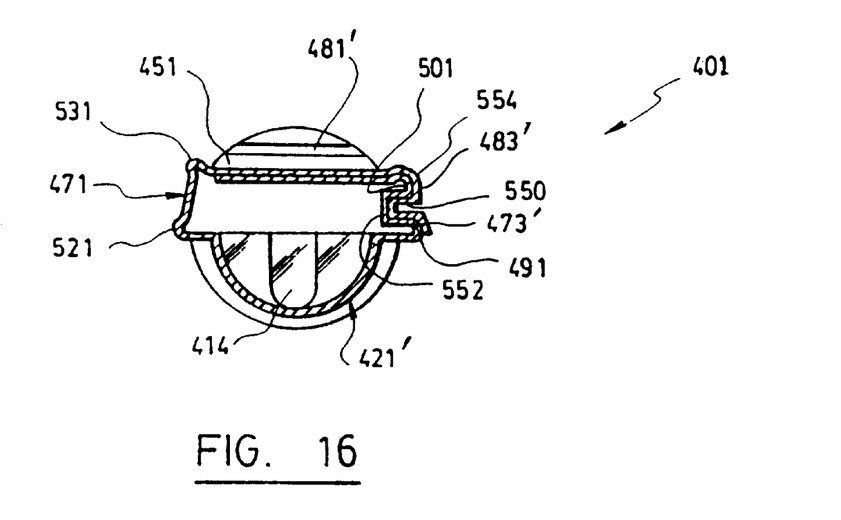
FIG. 16 is a transversal cross-sectional view of the container of FIG. 13, shown with the covers in a closed position and taken along line XVI—XVI.

A second variant of the container according to the present invention is shown in FIGS. 13 to 16. The container 401 is preferably slightly identical to the container 201 illustrated in FIG. 9 to 12, with the exception of the following:

the prehension tongue 483' is similar to the one of the container 1;

the hinge means 554 are similar to the hinges 61, 71, 91 and 101 and allow the tongue 483' to pivot between two distinct positions, namely a closed position (see FIG. 16) and an open position (see FIG. 13);

the prehension tongue 483', as well as the first element 473', are preferably provided with reversible locking means in two parts.

More particularly, the prehension tongue 483' is provided with a boss 550, and the first element 473' is provided with a cavity 552, the boss 550 and the cavity 552 being sized to be mutually engageable when the tongue 283' is pivoted around the hinge 554, both being reversibly engageable with a sufficient degree of friction to define a reversible locking engagement.

All the other parts of the container 401 are identical to those of the container 201. In FIGS. 13 to 16, the reference numerals are thus identical but are incremented by "200". For example, the hinge 461 of the container in FIG. 13 is identical to the hinge 261 in FIG. 9, and so forth.

The use of the container 401 is identical to the use of the container 201, with the exception that during the closing of the container, the steps for pivoting the tongue 283' around the hinge 554 and the positioning of the boss 550 in the cavity 552 are realized once the other steps are performed, and, during the opening, the reverse steps are realized before the other opening steps.

Figure 9:
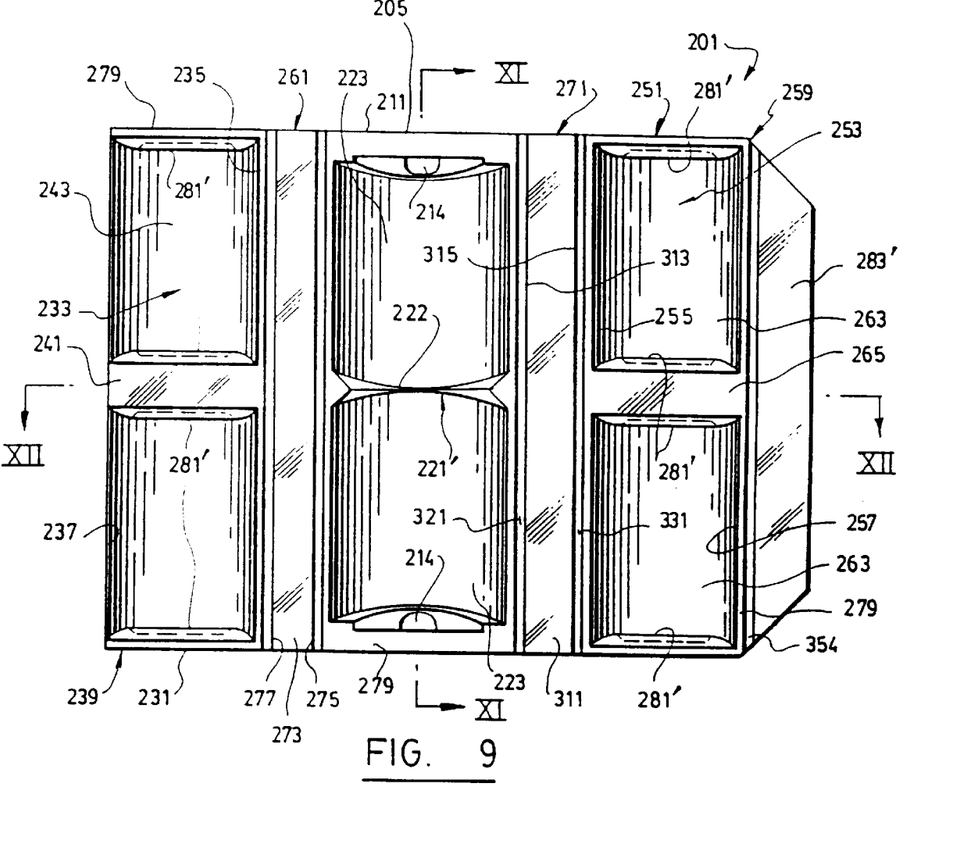
FIG. 9 is a top view of a first variant of a container according to the invention, shown with the covers in an open position.
Figure 10:
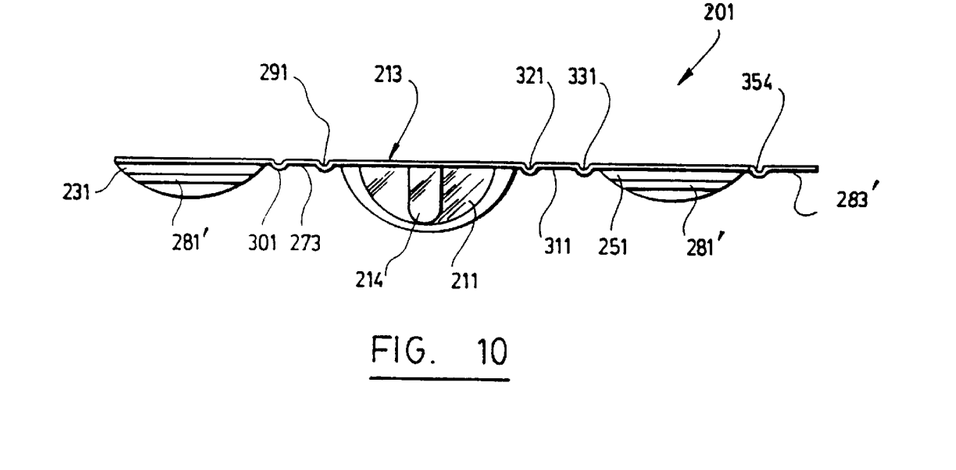
FIG. 10 is a side view of the end of the container of FIG. 9.

Preferably, the ends of the recesses 213 and 413 may be provided with reinforcing bosses 214, 414. These bosses allow to facilitate the stacking of the containers in an open position for the conditioning, transport, sale, etc.

Of course, the invention comprises each variation of the defined embodiment, which may be easily found by a person skilled in the art.

What is claimed is:

1. A reusable container for coins or tokens, the container comprising a moldable plastic sheet having:

a first sheet portion that is partially molded to define a semi-cylindrical recess, the first portion having a pair of longitudinal and substantially mutually parallel sides;

first divider means for dividing the recess of the first portion into at least two compartments, each receiving a predetermined number of coins or tokens;

a second sheet portion that is molded to define a semi-cylindrical recess, the second portion having a pair of longitudinal and substantially mutually parallel sides, the sides being further substantially parallel to one of the longitudinal sides of the first portion, and defining a first cover of the container;

second divider means for dividing the recess of the second portion into at least two compartments, each corresponding to a compartment of the first portion;

a third sheet portion that is partially molded to define a semi-cylindrical recess, the third portion having longitudinal and substantially mutually parallel sides, the sides being further parallel to one of the longitudinal sides of the first portion and defining a second cover of the container;

first hinge means for pivotally connecting one of the longitudinal sides of the first portion with one of the longitudinal sides of the second portion;

second hinge means for pivotally connecting the other longitudinal side of the first portion with one of the longitudinal sides of the third portion; and reversible locking means for locking the first and second covers, the locking means being positioned at opposite ends of the recesses of the second and third portions.

2. A container according to claim 1, wherein the reversible locking means comprise a locking device on each end of the recesses of the second and third portions, each locking device having a boss and a cavity sized to be reversibly and mutually engageable to removably lock the first and second covers on each other.

3. A container according to claim 1, wherein each portion has a periphery which defines a reinforcement edge.

4. A container according to claim 1, wherein the plastic sheet is made of thermoplastic.

5. A container according to claim 1, wherein each recess comprises opposite ends that are substantially parallel in order to position coins or tokens in a substantially parallel way to prevent the covers from closing if an extra coin or token is present.

6. A reusable container for coins or tokens, the container comprising, in combination and in a mouldable plastic sheet, having a pair of opposite longitudinal sides and a pair of opposite transverse sides:

a first sheet portion that is moulded to define a semi-cylindrical recess with a cross section representing about 40% of a circle, the first portion having a pair of longitudinal and substantially mutually parallel sides, which are further parallel to one of the longitudinal sides of the sheet;

first divider means for dividing the recess of the first portion into at least two compartments, each receiving a predetermined number of coins or tokens;

a second sheet portion that is moulded to define a semi-cylindrical recess with a cross section representing about 10% to 20% of a circle, the second portion having a pair of longitudinal and substantially mutually parallel sides, the sides being further substantially parallel to one of the longitudinal sides of the first portion, and defining a first cover of the container;

second divider means for dividing the recess of the second portion into at least two compartments, each corresponding to a compartment of the first portion;

a third sheet portion that is moulded to define a semi-cylindrical recess with a cross section representing about 10% to 20% of a circle, the third portion having longitudinal and substantially mutually parallel sides, the sides being further parallel to one of the longitudinal sides of the first portion and defining a second cover of the container;

third divider means for dividing the recess of the third portion into at least two compartments, each corresponding to a compartment of the second portion;

first hinge means for pivotally connecting one of the longitudinal sides of the first portion with one of the longitudinal sides of the second portion;

second hinge means for pivotally connecting the other longitudinal side of the first portion with one of the longitudinal sides of the third portion; and reversible locking means for locking the first and second covers, the locking means being positioned at opposite ends of the recesses of the second and third portions.

7. A container according to claim 6, wherein the first hinge means comprise:

a first sheet element having a pair of longitudinal and substantially mutually parallel sides, the sides being further parallel to the longitudinal sides of the first portion of the container;

third hinge means for pivotally connecting one of the longitudinal sides of the first sheet element with one of the longitudinal sides of the first portion of the container; and fourth hinge means for pivotally connecting the other longitudinal side of the first sheet element with one of the longitudinal sides of the second portion of the container;

and wherein the second hinge means comprise:

a second sheet element having a pair of longitudinal and substantially mutually parallel sides, the sides being further parallel to the longitudinal sides of the first portion of the container;

fifth hinge means for pivotally connecting one of the longitudinal sides of the second sheet element with the other longitudinal side of the first portion of the container; and sixth hinge means for pivotally connecting the other longitudinal side of the second sheet element with one of the longitudinal sides of the third portion of the container.

8. A container according to claim 7, wherein the reversible locking means comprise a locking device in each end of the compartments of the second and third portions of the container, each locking device having a boss and cavity sized to be reversibly and mutually engageable to removably lock the first and second covers on each other, and each compartment having a bottom and two opposite ends, the ends of each compartment of the second and third portions of the container slightly converging towards each other from the bottom of the compartment, and the ends of each compartment of the first portion of the container mutually diverging from the bottom of the compartment.

9. A container according to claim 8, wherein the first divider means comprise a pair of divider elements located on the opposite sides of the first portion of the container, each divider element consisting of a boss.

10. A container according to claim 8, wherein the second divider means comprise a first divider element located transversely in the recess of the second portion of the container and having a groove, said first divider element being aligned with the corresponding first divider means, and the third divider means comprising a second divider element transversely located in the recess of the third portion of the container, the second divider element being engageable in the groove of the first divider element.

11. A container according to claim 10, wherein the groove has a dovetail-shaped cross section.

12. A container according to claim 10, wherein each of the third, fourth, fifth and sixth hinge means comprises a sheet portion moulded to define a small groove having an opening oriented on the same side as the opening of the compartments.

13. A container according to claim 8, wherein each locking device extends on the whole width of the upper portion of the end of the compartments of the first and second covers, and consists of an association of a cavity and a boss which are both angulated and showing corresponding profiles.

14. A container according to claim 8, wherein the first divider means comprise a divider element having a triangle profile with a cross section that becomes smaller towards the bottom of the recess of the first portion of the container.

15. A container according to claim 7, wherein each of the third, fourth, fifth and sixth hinge means comprises a sheet portion moulded to define a small groove having an opening oriented on the same side as the opening of the compartments.

16. A container according to claim 7, wherein the third portion of the container comprises a prehension tongue on the longitudinal side which is opposite the one that is pivotally connected to the second sheet element.

17. A container according to claim 16, wherein the prehension tongue is provided with a seventh hinge means allowing the tongue to tilt between two extreme positions, the container being further provided with another reversible locking means comprising a boas located on the prehension tongue and a cavity located on the first sheet element, the boss being engageable into the cavity upon tilting of the prehension tongue around the seventh hinge means.

18. A container according to claim 7, wherein each portion of the container has a periphery which defines a reinforcement edge, with the exception of the corresponding periphery on the side of the first cover which is opposite the side cooperating with the third hinge means.

19. A container according to claim 6, wherein the second and third divider means comprise indexation means.

20. A container according to claim 19, wherein the indexation means comprise an indexation stopper located on the third divider means and a corresponding cavity located on the second divider means to receive the stopper.

* * * * *

UNITED STATES PATENT AND TRADEMARK OFFICE
CERTIFICATE OF CORRECTION

PATENT NO. : 5,957,275                                  Page 1 of 2
DATED      : September 28, 1999
INVENTOR(S) : Lemaire

It is certified that error appears in the above-identified patent and that said Letters Patent is hereby corrected as shown below:

At column 1, line 35, "be" should be -- is --.

At column 1, line 40, "Another object ... coins or tokens." is missing from letters patent.

At column 2, line 56, contain" should be --container--.

At column 2, line 57, "sheets" should be --sheet 5--.

At column 3, line 32 "advantageously comprise:" should be --are preferably integral with--.

At column 3, lines 36, 49 and 52, "111" should be -11--.

At column 3, line 44 ":" after "with" should be deleted.

UNITED STATES PATENT AND TRADEMARK OFFICE
CERTIFICATE OF CORRECTION

PATENT NO. : 5,957,275
DATED : September 28, 1999
INVENTOR(S) : Lemaire

It is certified that error appears in the above-identified patent and that said Letters Patent is hereby corrected as shown below:

At column 4, lines 36 and 37, "other 5" should be --others--.

At column 4, lines 40 "and" should be deleted.

At column 5, line 23 "show" should be --comprise--.

At column 8, line 62 "boas" should be --boss--.

Signed and Sealed this

Sixteenth Day of May, 2000

Attest:

Q. TODD DICKINSON

*Attesting Officer*   *Director of Patents and Trademarks*